Sept. 30, 1952  E. A. ANGERBY ET AL  2,612,152
DEVICE FOR PRESHAPING GRINDING DISKS
Filed July 29, 1949
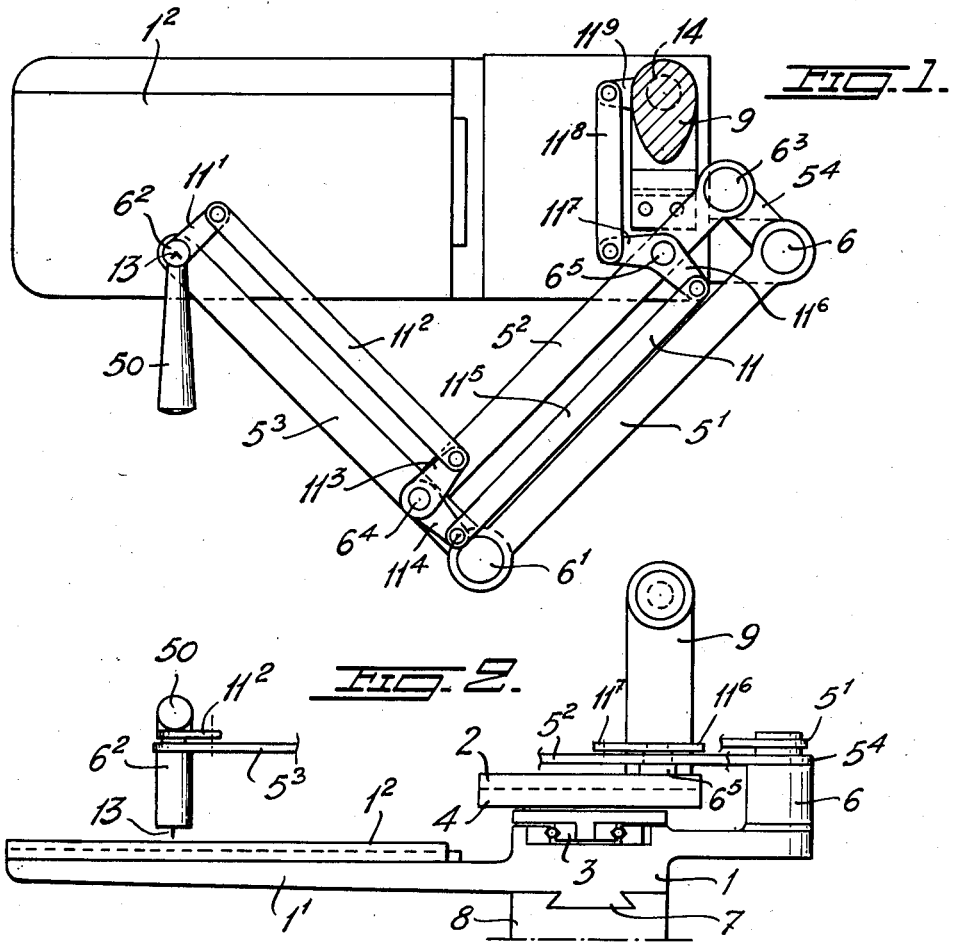
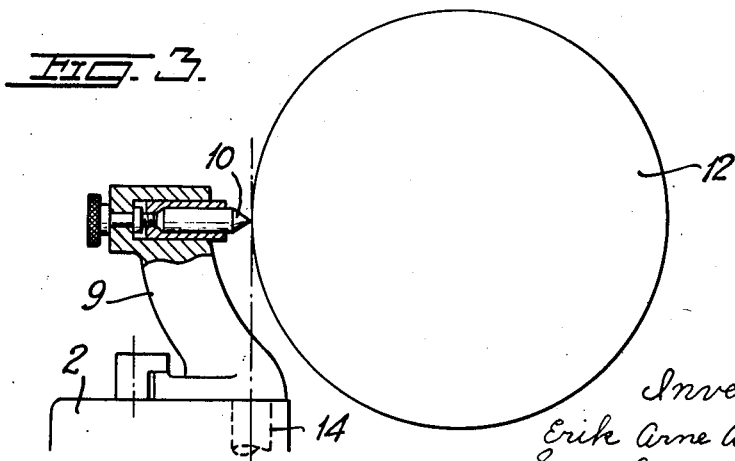
Inventors
Erik Arne Angerby
Sven Gunnar Axsäter
Sven Gerhard Blom
by Sommers & Young
Attorneys Patented Sept. 30, 1952

2,612,152

UNITED STATES PATENT OFFICE 2,612,152

DEVICE FOR PRESHAPING GRINDING DISKS

Erik Arne Angerby, Sven Gunnar Axsäter, and Sven Gerhard Blom, Nynashamn, Sweden Application July 29, 1949, Serial No. 107,478
In Sweden August 11, 1948

3 Claims. (Cl. 125—11)

1

This invention relates to devices for preshaping grinding discs to be used in producing shaped works, such grinding discs being trued in advance by a diamond tool to a shape corresponding to the desired profile of the works.

The main object of the invention is to provide a simple and practical device for guiding the diamond tool in shaping the grinding disc to the desired profile.

Another object of the invention is to provide such a device which is easy to manipulate.

Still another object of the invention is to provide a device of the kind referred to capable of securing exact shaping of the grinding disc also for complicated and irregular work profiles.

To attain these and other objects the invention consists in the construction and novel combination and arrangement of parts hereinafter fully described, illustrated on the accompanying drawings and pointed out in the claims hereunto appended.

On said drawing:

Fig. 1 is a top plan view, partly in section, of the improved device.

Fig. 2 is a front view of said device with parts broken away for the sake of simplifying the drawing.

Fig. 3 is a fractional side elevation, partly in section, of the truing tool support together with the truing tool proper and a grinding disc shown diagrammatically to be shaped by said tool.

With reference to the drawing, the numeral 1 indicates a base plate slidably mounted in a rectilinear guideway 7 of a stationary frame portion 8. The base plate 1 is formed with an extension $1^1$ on which is mounted a template support $1^2$. Mounted on said base plate 1 by means of two slides 3 and 4 capable of sliding in two directions at right angles to each other, is a table 2. The movement of the table 2 in the directions determined by the slides 3 and 4 is controlled by means of a control lever 50 via a pantograph indicated as a whole by the reference numeral 5. Said pantograph comprises a primary link $5^1$ pivoted on its one end, at 6, to the base plate 1, a secondary link $5^2$ parallel thereto, and connecting links $5^3$ and $5^4$ therebetween the pivots of which are numbered $6^1$, $6^4$, and 6, $6^3$ respectively. The connecting link $5^3$ is extended beyond pivot $6^4$ and supports at its free end a stylus carrier $6^2$, rotatably mounted therein. Said carrier extends at right angles to the template support $1^2$ and carries at its bottom end a stylus 13 for tracing a template on the support $1^2$. The secondary link $5^2$ of the pantograph is pivoted to the table

2

2 by a pivot $6^5$ located at an inner point of link $5^2$. The relative lengths of the various links of the pantograph and the positioning of pivot $6^5$ with relation to pivots $6^3$ and $6^4$ is such as to determine the ratio of the pantograph, which in the example shown, is 5:1.

Mounted on the table 2 so as to be capable of oscillation about a shaft 14 at right angles thereto, is a support 9 for a truing tool, such as a diamond 10, Fig. 3, the axis of said shaft 14 extending tangentially with relation to a grinding disc to be trued at the contact point between the diamond 10 and said disc, as indicated in Fig. 3. In said figure the numeral 12 indicates a grinding disc to be trued. Said disc is only represented by a circle. In practice, it should be rotatably mounted on a central shaft, not shown, extending at right angles to the direction of the guideway 7.

Inserted between the carrier $6^2$ for the stylus 13 and the support 9 for the truing tool is a parallelogram direction guiding device 11. Said device comprises a series of link parallelograms coupled together which are mounted to the pantograph in the following way. One link parallelogram including links $11^1$, $11^2$, $11^3$ extends along link $5^3$ for connecting the carrier $6^2$ with the pivot $6^4$. Another link parallelogram including links $11^4$, $11^5$, $11^6$ extends along link $5^2$ for connecting the pivot $6^4$ with the pivot $6^5$ and a third link parallelogram including links $11^7$, $11^8$, $11^9$ connects the pivot $6^5$ with the shaft 14 of the truing tool support 9. Links $11^3$ and $11^4$ are rigidly connected together so as to form a bell crank lever, and links $11^6$ and $11^7$ are formed integrally with each other. By this parallelogram linkage the support 9 for the truing tool 10 and the carrier $6^2$ for the stylus 13 are always caused to take up equal angular positions with relation to their axes of rotation. By this means it is easy to secure that the longitudinal direction of the truing tool is at every instant perpendicular to the surface of the grinding disc to be trued. If the direction of lever 50 is parallel to the longitudinal direction of the truing tool said result may be obtained simply by always keeping the lever 50 perpendicular to the contour of the template. This effect is of particular advantage in truing irregular profiles.

The present invention is particularly adapted for face grinding machines but may also be used for cylindrical grinding machines, simple grinding stands and similar equipments in which preshaping of grinding discs to any desired profile may be advantageously made.

What we claim is:

1. In a grinding wheel truing device the combination of a base structure comprising a fixed frame member having a straight guideway and a base member slidably mounted in said guideway, said base member having a template support, a pair of superposed slides mounted on said base for allowing the uppermost slide to move with relation to the base member in two directions at right angles to each other, a truing tool support mounted on said uppermost slide for oscillation about a vertical axis, a truing tool inserted in said support so as to have its operative point located on the extension of said axis, a pantograph having one pivot connected to said base member, having another pivot connected to the uppermost slide, and having at its free end a stylus carrier mounted therein to oscillate about an axis parallel to the axis of the truing tool support, a stylus in said carrier pointing towards the top of the template support, and a parallelogram linkage mounted on the pantograph and having one end connected with the stylus carrier and the other end connected with the truing tool support for transmitting the oscillations of the stylus carrier to the truing tool support.

2. A grinding wheel truing device as claimed in claim 1, in which the portion of the pantograph which is pivoted to the base member is an end of a primary link, said pantograph also having a secondary link connected to said primary link by connecting links so as to form a parallelogram in conjunction therewith, and an extension of the connecting link remote from the pivot connected to the base member for supporting the stylus carrier, the further feature that said secondary link is pivotally connected to the uppermost slide said pivoted connection being located at a point intermediate the pivots at the ends of said secondary link.

3. In a grinding wheel truing device as claimed in claim 2, the further feature that the parallelogram linkage comprises a series of link parallelograms, including one extending between the stylus carrier and the adjacent pivot connected to the secondary link of the pantograph, another extending between said last mentioned pivot and the pivot connected to the uppermost slide, and a further link parallelogram extending between said last mentioned pivot and the truing tool support.

ERIK ARNE ANGERBY.
SVEN GUNNAR AXSÄTER.
SVEN GERHARD BLOM.

REFERENCES CITED

The following references are of record in the file of this patent:

UNITED STATES PATENTS

| Number | Name | Date |
|---|---|---|
| 1,964,319 | Gorton | June 26, 1934 |
| 2,038,455 | Studer | Apr. 21, 1936 |
| 2,234,539 | Cooke | Mar. 11, 1941 |
| 2,347,283 | Ross | Apr. 25, 1944 |
| 2,434,834 | Civitarese | Jan. 20, 1948 |
| 2,452,509 | Victory | Oct. 26, 1948 |

FOREIGN PATENTS

| Number | Country | Date |
|---|---|---|
| 623,395 | Great Britain | May 17, 1949 |
| 626,225 | Great Britain | July 12, 1949 |